May 26, 1964   M. H. A. VAN DE WEIJER ETAL   3,134,920
SODIUM-VAPOR DISCHARGE LAMP WITH A NONDISCOLORING ENVELOPE
Filed Jan. 6, 1961
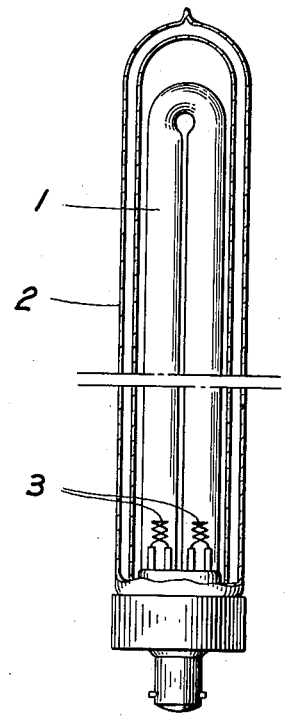
INVENTORS.
MARTINUS H. A. VAN DE WEIJER
RAYMOND F. SPIESSENS
BY  COENRAAD M. LA GROUW
AGENT

3,134,920
SODIUM-VAPOR DISCHARGE LAMP WITH A NONDISCOLORING ENVELOPE
Martinus Henricus Adrianus van de Weijer, Raymond Francois Spiessens, and Coenraad Maria La Grouw, all of Emmasingel, Eindhoven, Netherlands, assignors to North American Philips Company, Inc., New York, N.Y., a corporation of Delaware
Filed Jan. 6, 1961, Ser. No. 81,122
Claims priority, application Netherlands Jan. 9, 1960
3 Claims. (Cl. 313—112)

This invention relates to sodium-vapor discharge lamps containing a mixture of rare gases composed substantially of neon and wherein the inner side of the discharge vessel is a borate glass which does not substantially discolor.

The addition to neon of a small amount of an other rare gas, for example 1% by volume of argon, has for its object to decrease the igniting voltage of the lamp.

Hitherto it has been found possible to combine a substantially nondiscoloring borate glass and an argon-containing filling of rare gas only if the pressure of the rare gas is made comparatively high and hence the properties of the lamp, such as efficiency and decline in light output, are detrimentally affected. At lower pressures, the desired decrease in igniting voltage no longer occurs after a comparatively short burning period due to the absorption of argon by the glass so that the lamp can no longer be put into operation.

An object of the invention is to improve this.

According to the invention, the borate glass has the following composition:

13 to 26% by weight of $B_2O_3$
0 to 20% by weight of $Al_2O_3$
0 to 8% by weight of $SiO_2$
55 to 85% by weight of alkaline-earth oxides and
0 to 3% by weight of alkaline oxides on the condition that $BaO = 40$ to 65% by weight
$SiO_2 + B_2O_3 = 15$ to 30% by weight
$SiO_2 + Al_2O_3 = 5$ to 25% by weight It has surprisingly been found that the argon in the range of substantially nondiscoloring borate glasses just defined, disappears so slowly that the useful length of life, with the lamp otherwise unchanged, is lengthened.

The borate glass preferably consists of:

13 to 26% by weight of $B_2O_3$
4 to 15% by weight of $Al_2O_3$
0 to 7% by weight of $SiO_2$
60 to 75% by weight of alkaline-earth oxides
0 to 3% by weight of alkaline oxides on the condition that $BaO = 40$ to 65% by weight
$SiO_2 + B_2O_3 = 19$ to 26% by weight
$SiO_2 + Al_2O_3 = 6$ to 18% by weight Since the disappearance of the argon in combination with the said compositions of the glass no longer causes difficulty, it is possible for the pressure of the neon-argon filling, which hitherto was from 13 to 20 mms. of mercury with non-discoloring borate glasses, to be decreased to from 3 to 10 mms. of Hg, resulting in a considerable increase in efficiency.

The invention will now be described in detail with reference to the following example.

A U-shaped sodium-vapor discharge tube 1 is arranged in a double-walled exhausted cylindrical envelope 2. The discharge tube, which is made of lime-glass has an internal diameter of 15 mms. and is internally provided with a thin layer of sodium-resistant glass of the following composition:

2.9% by weight of $SiO_2$
19.1% by weight of $B_2O_3$
4.4% by weight of $Al_2O_3$
59.0% by weight of BaO
10.4% by weight of CaO
4.2% by weight of MgO The tube has activated thermionic electrodes 3 at its ends and has a length of 80 mms. between the electrodes, as measured along the axis of the tube. The tube contains about 1000 mgs. of sodium metal and a filling of neon at a pressure of approximately 6 mms. of Hg at room temperature, to which about 1% by volume of argon has been added. The tube which, in normal operation has a consumption of about 130 watts at the tube current of 0.9 amp, has an arc voltage of about 155 volts and an igniting voltage of 390 volts at the beginning of its life and is supplied from an alternating-voltage source of 470 volts no-load voltage. This tube reaches a lifelength of, for example, 6000 hours, which is considerably longer than the lifelength of 4000 hours obtained hitherto.

At the beginning of its life, the tube has a light output of about 103 lumens per watt and, after 4000 working hours, a light output of about 94 lumens per watt. The last-mentioned value is about 25 lumens per watt higher than what could be obtained hitherto.

What is claimed is:

1. A sodium vapor lamp comprising a light transmissible envelope having a wall consisting of a nondiscoloring borate glass having a composition:

13 to 26% by weight of $B_2O_3$
up to 20% by weight of $Al_2O_3$
up to 8% by weight of $SiO_2$
55 to 85% by weight of
alkaline earth metal oxides including
40 to 65% by weight of BaO
up to 3% by weight of alkali metal oxides
with $SiO_2 + B_2O_3$ being equal to
15 to 30% by weight and
$SiO_2 + Al_2O_3$ being equal to
5 to 25% by weight, spaced electrodes positioned within said envelope, and a filling within said envelope consisting of sodium and a mixture of rare gases, said rare gas mixture consisting substantially of neon containing about 1% by volume of argon.

2. A sodium vapor lamp comprising a light transmissible envelope having a well consisting of a nondiscoloring borate glass having a composition:

13 to 26% by weight of $B_2O_3$
4 to 15% by weight of $Al_2O_3$
up to 7% by weight of $SiO_2$
60 to 75% by weight of
alkaline earth metal oxides including
40 to 65% by weight of BaO
up to 3% by weight of alkali metal oxides
with $SiO_2 + B_2O_3$ being equal to
9 to 26% by weight and
$SiO_2 + Al_2O_3$ being equal to
6 to 18% by weight, spaced electrodes positioned within said envelope, and a filling within said envelope consisting of sodium and a mixture of rare gases, said rare gas mixture consisting substantially of neon containing about 1% by volume of argon.

3. A sodium vapor lamp comprising a light transmissible envelope having a wall consisting of a nondiscoloring borate glass having a composition:

13 to 26% by weight of $B_2O_3$
up to 20% by weight of $Al_2O_3$
up to 8% by weight of $SiO_2$
55 to 85% by weight of
alkaline earth metal oxides including
40 to 65% by weight of BaO
up to 3% by weight of alkali metal oxides
with $SiO_2+B_2O_3$ being equal to
15 to 30% by weight and
$SiO_2+Al_2O_3$ being equal to
5 to 25% by weight, spaced electrodes positioned within said envelope, and a filling within said envelope consisting of sodium and a mixture of rare gases at a pressure of about 3 to 10 mms. of Hg at room temperature, said rare gas mixture consisting substantially of neon containing about 1% by volume of argon.

References Cited in the file of this patent
UNITED STATES PATENTS

| | | |
|---|---|---|
| 2,152,988 | Elenbaas et al. | Apr. 4, 1939 |
| 2,161,824 | Krefft et al. | June 13, 1939 |
| 2,899,584 | Verwey | Aug. 11, 1959 |